May 4, 1926.　　　　　　　　　　　　　　　1,583,332
D. BEHRSING ET AL.
HAND STARTING CRANK MECHANISM FOR ENGINES
Filed March 28, 1924
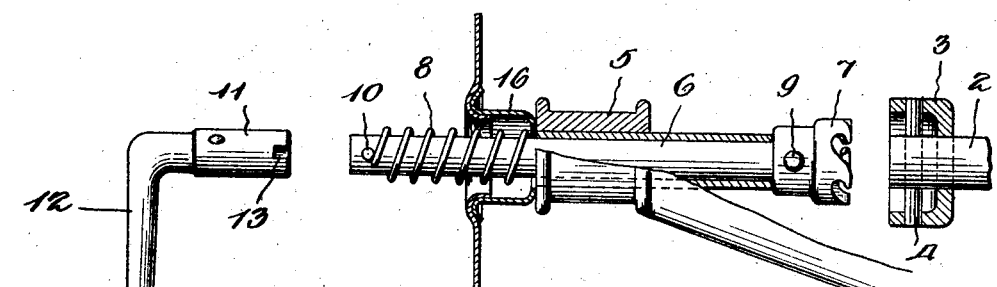
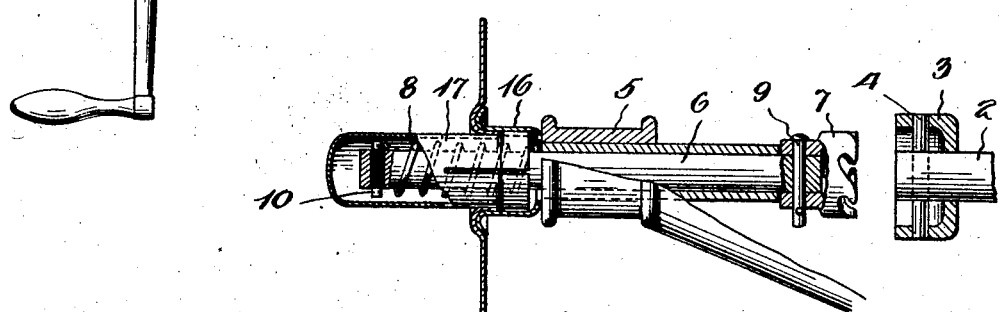
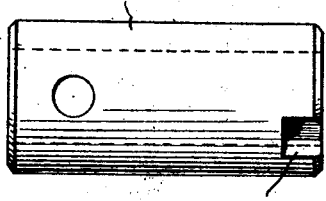
Inventors,
David Behrsing,
Frederick N. Menke, Jr.
By John S. Barker
Attorney Patented May 4, 1926.

1,583,332

UNITED STATES PATENT OFFICE.

DAVID BEHRSING AND FREDERICK W. HENKE, JR., OF PHILADELPHIA, PENNSYLVANIA, ASSIGNORS TO FOX AUTOMOTIVE PRODUCTS CORPORATION, OF PHILADELPHIA, PENNSYLVANIA, A CORPORATION OF DELAWARE.

HAND-STARTING-CRANK MECHANISM FOR ENGINES.

Application filed March 28, 1924. Serial No. 702,497.

*To all whom it may concern:*

Be it known that we, DAVID BEHRSING and FREDERICK W. HENKE, Jr., citizens of the United States, residing at Philadelphia, in the county of Philadelphia and State of Pennsylvania, have invented certain new and useful Improvements in Hand-Starting-Crank Mechanism for Engines, of which the following is a specification.

Our invention relates to starting crank mechanism for automobiles. Very many of the automobiles now on the market are equipped with starting cranks that are permanently attached, and while there are some advantages incident to that arrangement in cars not provided with electric starters, it is quite undesirable where such starters are provided.

Our invention, therefore, has for its object to provide a starting crank arrangement that can be easilly substituted for those with which many cars are now equipped where the crank is non-removable, in which the crank may be easily separated from the shaft to which it is applied, permitting it to be carried in the tool box or otherwise disposed of so as to be out of sight.

In the accompanying drawings—

Figure 1 is a view illustrating the invention with the crank about to be applied;

Fig. 2 is a view partly in elevation and partly in section the crank being entirely removed and the end of the shaft to which it is applied covered by a protecting cap.

Fig. 3 is a detail view of the crank sleeve or coupling.

Fig. 4 is a side view of the pin 10.

Fig. 5 is an end view of the pin.

In the accompanying drawings, 2 indicates the crank shaft of an automobile engine, to the outer end of which may be secured, as is usual, the fan belt pulley 3, and a cross pin 4. Directly in front of the shaft 2 and in alignment therewith is located on some suitable part of the framework of the car, a bearing 5 in which is supported a shaft 6, to the inner end of which is secured a clutch 7 adapted to be brought into engagement with the cross pin 4 of the crank shaft. The shaft 6 is free to move longitudinally in the bearing 5, and is acted upon by a coiled spring 8 that normally holds it in its outermost position, that is, with the clutch 7 disengaged from the crank shaft. The hub of the clutch, which fits the inner end of the shaft 6 and is fastened thereto by a bolt or rivet 9, may rest against the inner face of the bearing 5 and serve as a stop to arrest the outward movement of the shaft 6. A pin 10 extends diametrically through the shaft near its outer end in position to be engaged by a sleeve coupling 11 that is secured fast to a crank 12. The sleeve coupling is adapted to slip over the outer end of the shaft 6 and is slotted, as indicated at 13, for engagement with the projecting ends of the pin 10.

The pin 10 has its central portion 14 knurled or formed with fine longitudinal grooves and ridges, and its end portions 15 smooth and slightly reduced in diameter as compared with the central part 14. The central knurled portion is of a length equal to the diameter of the shaft 6. A pin thus constructed and driven tightly into an aperture of a size to receive it is not liable to loosen and become lost, even when subjected to the violent and constant vibrations incident to its use and location.

16 indicates a cup piece or pan through which the shaft 6 passes. It is suitably supported in the framework of the car and is of a diameter to leave ample space between its side walls and the shaft for the spring 8 and also to receive the inner end of a cap 17 adapted to fit over the exposed end of the shaft. This cap under ordinary conditions remains in place, as indicated in Fig. 2. When, however, the engine has to be cranked by hand, it is removed, exposing the end of the shaft 6, as represented in Fig. 1. The separable crank 12 is then applied, its sleeve 11 fitting over the exposed end of the shaft 6 and engaging with the cross pin 10. This engagement having been effected pressure is applied and the shaft 6 moved longitudinally in its bearing 5, causing the clutch 7 to come into engagement with the cross pin of the crank shaft 2. The engine may now be cranked as usual.

It will be seen that we avail ourselves of parts that are standard equipment, as for instance, the crank 12 and the clutch 7. To the former, the crank, is fast secured the coupling sleeve 11, and to the latter, the clutch 7, the shaft 6. By the use of these simple parts a hand starting crank mechanism having a separable crank can be cheaply and quickly installed on cars now equipped with permanently attached starting cranks.

What we claim is:

1. A hand operating starting crank mechanism for automobiles, comprising a crank shaft connected with the engine, a separate shaft in alignment therewith provided at its inner end with a clutch element, the said shaft being movable longitudinally so that the clutch may be brought into working engagement with the crank shaft, a separable hand crank provided with a sleeve adapted to fit over and engage with the exposed end of the said aligning shaft for rotating the latter, a cup piece extending inward from a frame element of the automobile, and a removable cap enclosing the outer end of said separate shaft and entering within said cup piece.

2. A hand operated starting crank mechanism for automobiles, comprising a crank shaft connected with the engine, a separate shaft in alignment therewith provided at its inner end with a clutch element adapted to have working engagement with the crank shaft to turn it, a bearing in which the aligning shaft is supported and in which it is free both to turn and move longitudinally, a spring acting on the aligning shaft and tending to maintain it out of engagement with the crank shaft, a separable hand crank provided with a sleeve adapted to fit over and engage with the exposed end of the said aligning shaft for rotating it, a cup piece extending inward from a frame element of the automobile, and a removable cap enclosing the outer end of said separate shaft and entering within said cup piece.

3. A hand operated starting crank mechanism for automobiles, comprising a crank shaft connected with the engine, a separate shaft in alignment therewith provided at its inner end with a clutch element adapted to have working engagement with the crank shaft to turn it, a bearing in which the aligning shaft is supported and in which it is free both to turn and move longitudinally, a cup-shaped piece extending inward from a frame element of the automobile and through which the aligning shaft passes, a spring surrounding the shaft and connected therewith and tending to maintain it out of engagement with the crank shaft, the end of the spring extending into the cup-shaped piece, and the outer end of the aligning shaft projecting beyond said piece and being exposed, a separable hand crank provided with a sleeve adapted to fit over and engage with the exposed end of the said aligning shaft for rotating it, and a cap adapted to be seated in the cup piece and adapted to fit over and protect the exposed end of the aligning shaft when the hand crank is not in use.

4. A hand operated starting crank mechanism for automobiles, comprising a crank shaft connected with the engine, a separate shaft in alignment therewith provided at its inner end with a clutch element, the said shaft being movable longitudinally so that the clutch may be brought into working engagement with the crank shaft, a pin extending diametrically through the aligning shaft near its outer end and having its opposite ends exposed, a separable hand crank provided with a sleeve adapted to fit over the exposed end of the aligning shaft, the end of the sleeve being slotted for engagement with the cross pin in the end of the aligning shaft, a cup piece extending inward from a frame element of the automobile, and a slotted cap having an enlarged inner end enclosing the outer end of said separate shaft and entering within said cup piece.

DAVID BEHRSING.
FREDERICK W. HENKE.